(12) United States Patent
Parks

(10) Patent No.: US 10,524,459 B2
(45) Date of Patent: Jan. 7, 2020

(54) FISHING LURE WITH BLADE ARRANGEMENT

(71) Applicant: Steve Parks, Burleson, TX (US)

(72) Inventor: Steve Parks, Burleson, TX (US)

( * ) Notice: Subject to any disclaimer, the term of this patent is extended or adjusted under 35 U.S.C. 154(b) by 0 days.

(21) Appl. No.: 14/154,646

(22) Filed: Jan. 14, 2014

(65) Prior Publication Data

US 2014/0196353 A1 Jul. 17, 2014

Related U.S. Application Data

(60) Provisional application No. 61/752,724, filed on Jan. 15, 2013.

(51) Int. Cl.
*A01K 85/00* (2006.01)
*A01K 85/14* (2006.01)

(52) U.S. Cl.
CPC .............. *A01K 85/00* (2013.01); *A01K 85/14* (2013.01)

(58) Field of Classification Search
USPC .............................................. 43/42.02, 42.03
See application file for complete search history.

(56) References Cited

U.S. PATENT DOCUMENTS

| | | | |
|---|---|---|---|
| 1,417,574 A | 5/1922 | Schmid | |
| 1,600,653 A * | 9/1926 | Steenstrup | A01K 85/16 43/42.03 |
| D91,170 S | 12/1933 | Jacobs | |
| 2,165,734 A | 7/1939 | Stracener | |
| 2,590,461 A | 3/1952 | Rasch | |
| 2,821,043 A | 1/1958 | Parker, Jr. | |
| D199,624 S | 11/1964 | Smail | |
| 3,157,959 A * | 11/1964 | Anderson | A01K 85/16 43/42.03 |
| 3,236,000 A * | 2/1966 | Pippert | A01K 85/14 43/42.09 |
| 3,238,660 A * | 3/1966 | Pcola | A01K 85/14 43/42.03 |
| 3,257,750 A * | 6/1966 | Shannon | A01K 85/00 43/42.06 |
| 3,313,058 A | 4/1967 | Fuerst | |
| 3,570,166 A * | 3/1971 | Borton | A01K 85/18 43/42.03 |
| 3,662,485 A | 5/1972 | Klemkowski | |
| 3,808,726 A * | 5/1974 | Flanagan, Jr. | A01K 85/00 43/42.13 |
| 4,432,157 A | 2/1984 | Gowing | |
| 4,718,191 A * | 1/1988 | Gentry | A01K 85/00 43/42.11 |
| 4,908,975 A | 3/1990 | Root et al. | |
| 5,117,573 A | 6/1992 | Semler | |

(Continued)

*Primary Examiner* — Christopher P Ellis
(74) *Attorney, Agent, or Firm* — Geoffrey A. Mantooth; Brian K. Yost

(57) ABSTRACT

A fishing lure has a body with an eye on a rear end portion. A blade is coupled to the eye by way of rings. The blade has two lateral portions, which are non-planar to one another and join together along a ridge. The ring component allows the blade to rotate between limits, with the blade rotating in one direction to a first limit and then rotating in the opposite direction to a second limit. This causes the blade to rotate then stop and then reverse rotation until the next stop. The rotation-stop movement of blade causes the lure to move erratically, mimicking a fish.

12 Claims, 4 Drawing Sheets

(56) References Cited

U.S. PATENT DOCUMENTS

| | | | |
|---|---|---|---|
| 5,491,927 A | 2/1996 | Ortiz | |
| 5,887,378 A * | 3/1999 | Rhoten | A01K 85/14 43/42.03 |
| 6,032,400 A | 3/2000 | Lau | |
| 6,598,336 B2 | 7/2003 | Link | |
| 7,493,724 B1 | 2/2009 | Peterson | |
| 7,621,068 B1 * | 11/2009 | Renosky | A01K 85/01 43/42.03 |
| 7,627,978 B2 * | 12/2009 | Davis | A01K 85/14 43/42.03 |
| 8,397,425 B1 * | 3/2013 | Alzamora | A01K 83/00 43/42.02 |
| 2005/0183323 A1 | 8/2005 | Harrell | |
| 2014/0165449 A1 * | 6/2014 | Yelton | A01K 85/14 43/42.02 |

* cited by examiner

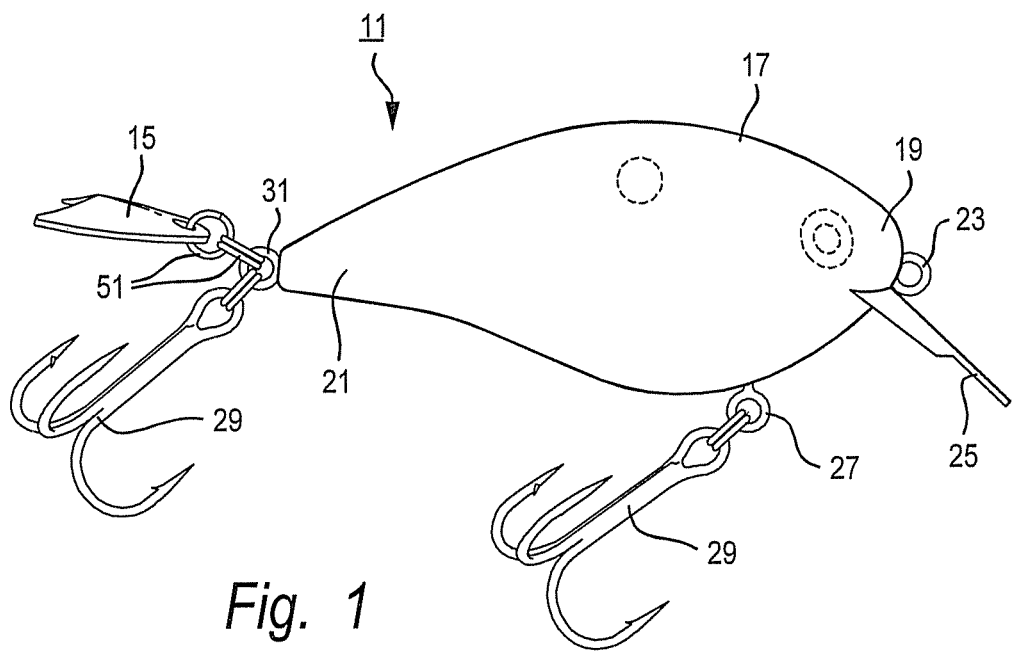
Fig. 1
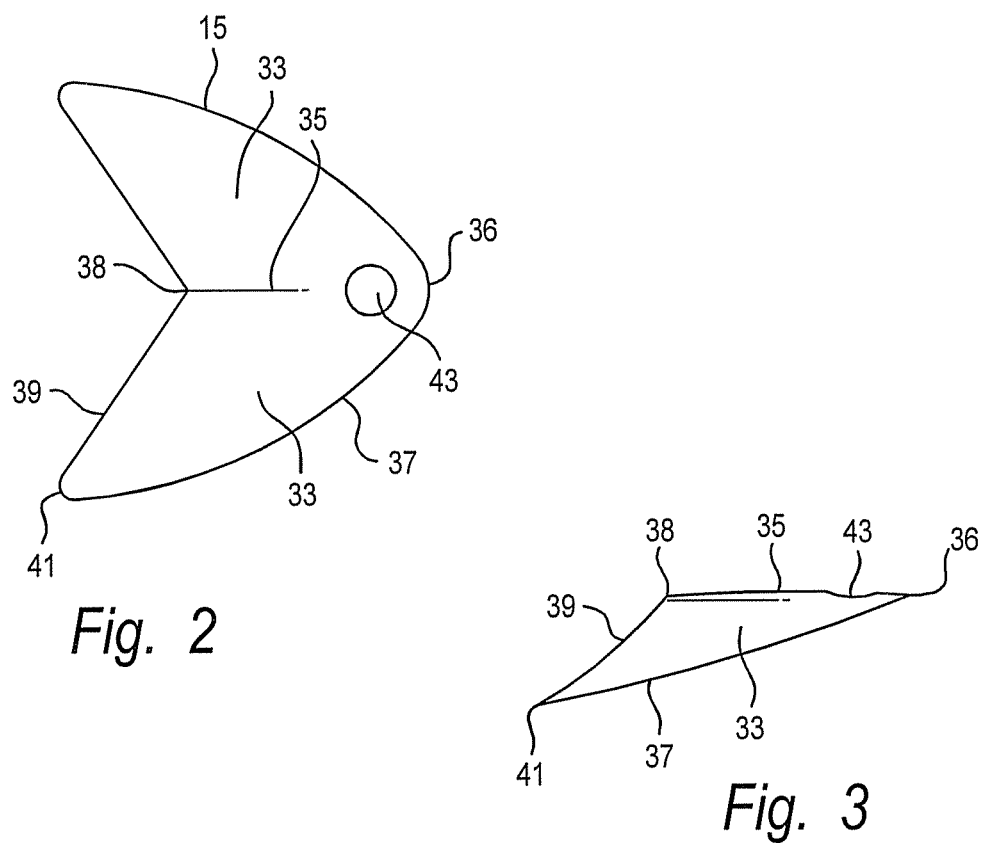
Fig. 2
Fig. 3

FISHING LURE WITH BLADE ARRANGEMENT

FIELD OF THE INVENTION

The present invention relates to fishing lures, and in particular to those lures that have an action or movement when they are retrieved.

BACKGROUND OF THE INVENTION

Fishing lures come in a variety of styles and types, such as, for example, crank baits, swim baits, worms, etc.

Some lures are provided with devices to make the lure move about when retrieved. For example, a lipped crank bait is equipped with a lip or bill at its front end. When the lure is retrieved, the crank bait dives. In another example, a lure can be provided with a tail. The tail either moves the lure or moves relative to the tail. Such movement is referred to as action. A lure that has action, that moves up and down or side-to-side, on a retrieve, is attractive to game fish such as bass. This is because the action emulates the actions of a bait fish.

In general, lures provide a constant, not an erratic, action. Often, during the retrieve of a prior art lure, a fish will swim or draft closer behind the lure to inspect it before striking. Some fish will not strike, instead turning away, due to the constant action of the lure. The lure, while having action, does not act natural and thus would not draw a strike from a game fish.

Often, an erratic unpredictable lure action is more desirable because it resembles a scared or fleeing bait fish or prey which is more likely to impart a chase from the fish and draw a strike. Anglers try to create this erratic lure action themselves in a variety of different ways including through a series of jerks and twitches of the rod tip or by varying the retrieve speeds of the lure itself or by bouncing the lure off of the bottom rocks and bushes. Using lures with multiple open hooks in this type of environment can be problematic, causing hang-ups.

Some lures/crank baits, etc. have or are designed with a tail blade mounted by way of a ball swivel, providing a constant revolution spinning of the blade itself. This ball swiveled tail assembly does not provide an erratic action or any direction changes during the retrieve. It only provides vibration and flash on the tail of the given lure and also causes drag or resistance which doesn't allow the lure to attain the depths that they may be capable of otherwise.

Some lures are equipped with a bill at the front end of the lure body. An example of such a lure is shown in FIG. 1. The bill, which extends forward and down, causes the lure body to dive and move side-to-side.

U.S. Pat. No. D199,624 is an example of a tail on a lure. The tail flutters behind the lure, much like a leaf on a tree. While the tail flutters, it does not move the body of the lure.

WO 2011/135736 is another example of a fishing lure. The lure is equipped with a trailing bill on its underbody, which bill is loosely coupled so as to move from side-to-side.

It is desired to improve upon existing fishing lures.

BRIEF DESCRIPTION OF THE DRAWINGS

FIG. 1 is a side view of a fishing lure equipped with a blade arrangement, in accordance with a preferred embodiment.

FIG. 2 is a top plan view of the blade.

FIG. 3 is a side view of the blade.

DESCRIPTION OF THE PREFERRED EMBODIMENT

Figure 4:
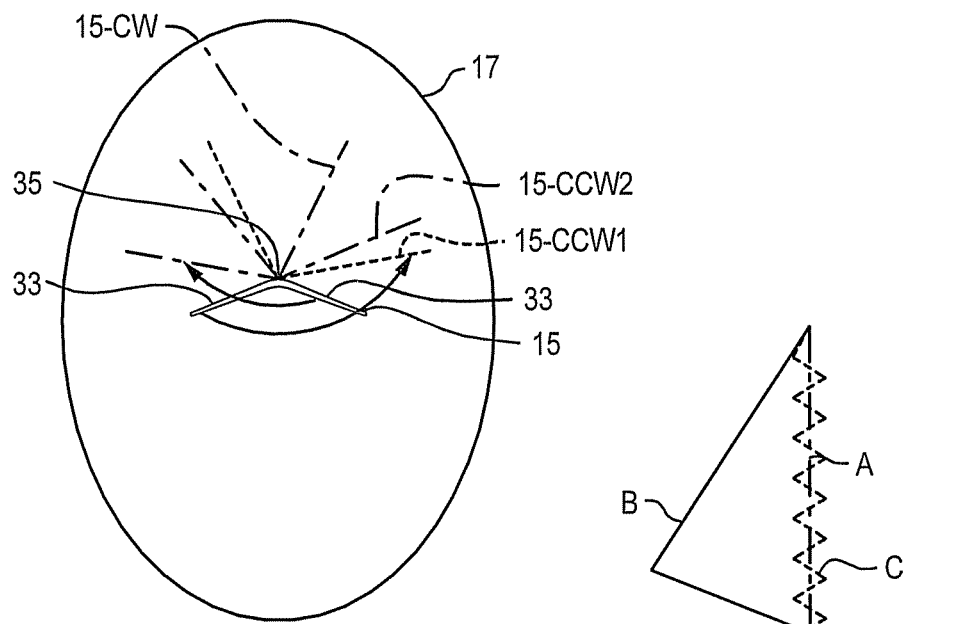
FIG. 4 is a rear end view of a blade arrangement and the lure shown in operation.

Referring to FIG. 1, the present invention provides a fishing lure 11 equipped with a blade arrangement that improves the action, or movement, of the lure as the lure is retrieved. A blade 15 is connected to the remainder of the lure by a twist arrangement. In the preferred embodiments the twist arrangement is one or more rings. The blade spins or rotates freely for a limited number of revolutions, or partial revolutions, upon which the blade abruptly stops rotating. The blade then acts as a rudder, wherein the lure moves to one side. The blade then rotates in the opposite direction for a limited number of revolutions, or partial revolutions, and abruptly stops rotating. The blade again acts as a rudder, causing the lure to move in another direction. The lure moves erratically, simulating the movement, or action, of a live bait fish. As a result, game fish, such as bass, will hit the lure. The erratic action is achieved on retrieve of the lure through the water. Because the lure need not be bounced off the bottom or obstructions, the lure will not become hung.

In the description that follows, like reference numbers among the figures means like components. Also, references to "upper", "lower" or similar terms are made with respect to the orientation shown in the drawings.

Figure 6:
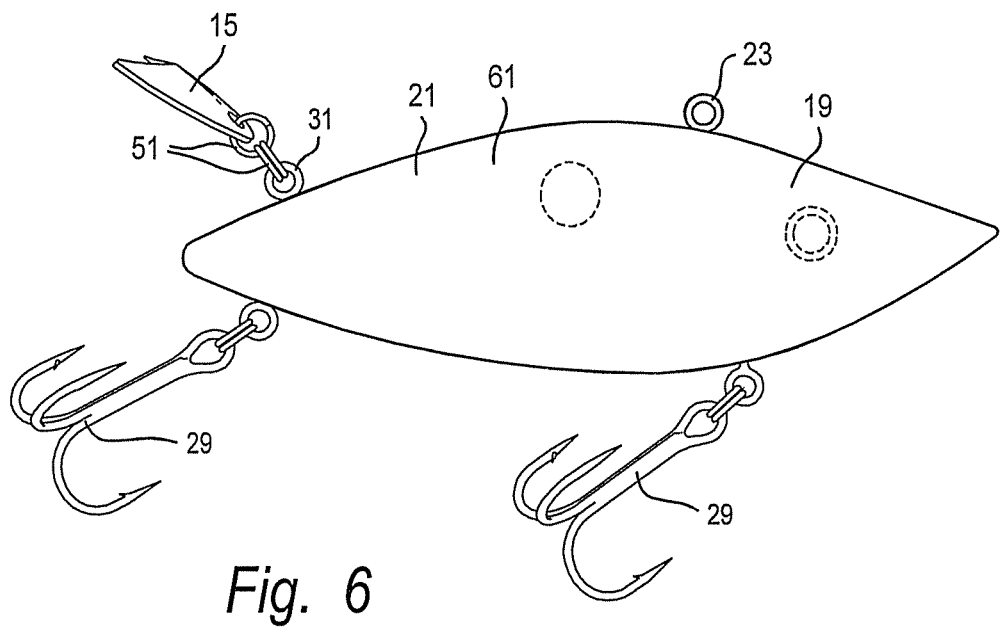
FIG. 6 is a side view of a fishing lure in accordance with another embodiment.

Although the fishing lure 11 of FIG. 1 is a crank bait, the lure can be other styles, such as swim baits, worms, etc. The lure 11 has a body 17. The body can be made of wood, plastic (hard or soft), etc. The body has a front end portion 19 and a rear, or tail, end portion 21. An eye 23 is provided on the front end portion; fishing line from a fishing pole or rod is tied to the eye. The body can be provided with a lip 25 or a bill at its front end portion. The bill causes the lure to dive on retrieve. The body can also be provided with one or more eyes 27 along its underside, or belly, which eyes receive hooks 29. The body also has a eye 31 on its rear end portion, which eye couples to the blade 15. As used herein, rear, or tail, end portion means at the rear end, such as is shown by the eye 31 in FIG. 1, or on the upper side of the rear end, such as is shown in FIG. 6. An eye located underneath the lure body is not considered to be on the rear, or tail, end portion. The top and under sides of the lure are identifiable from the hook locations (the hooks are located on the underside) and by the appearance of the lure if the lure looks like a fish or other animal.

The blade 15, shown in FIGS. 2-4, has a leading edge and is cupped. In the preferred embodiment, the blade is shaped like a sideways "V" when viewed in a plan view, with the orientation of FIG. 2. The shape of the blade in plan view can be some other shape.

The blade has two lateral portions 33 joined together along a ridge 35 or spine. The ridge 35 has a front end 36 and a rear end 38. The lateral portions 33 are not coplanar and are angled with respect to each other. The acute angle between the lateral portions is 120-150 degrees and is about 135 degrees in the preferred embodiment. In an end view (see FIG. 4), the blade looks like an upside down shallow "V". (The blade 15 looks substantially similar when viewed from the front and rear ends.)

Each lateral portion 33 is generally triangular in plan view, having a side along the ridge 35, a leading edge 37 and a trailing edge 39. The leading edge 37 is curved, extending from the front end 36 of the ridge 35 laterally out and rearwardly. The trailing edge 39 extends from the rear end 38 of the ridge laterally out and rearwardly, where it meets the leading edge at a tip 41. The tip 41 is located rearward of the ridge rear end 38 (see FIGS. 2 and 3). This gives the blade, in plan view as shown in FIG. 2, the appearance of a "V" or a "U", wherein the tips 41 extend farther to the rear than does the rear end 38 of the top portion 35. A hole 43 is positioned near the front end 36.

Figure 4A:
FIG. 4A is an end view of the blade in accordance with another embodiment.

The blade need not be "V" shaped when viewed at an end. The blade 15C can be rounded or cup shaped, as shown in FIG. 4A. Such a shape is like a shallow upside down "U". Also, the blade need not have a "V" or "U" shape when viewed in plan view; the blade can be round or oval, such as spoon shaped.

The blade is cupped by an amount X:Y, where X is the distance between the two outermost tips 41 (the width of the blade as shown in FIGS. 4 and 4A), and Y is the distance between the top portion 35 and the line used to measure X (the height of the blade as shown in FIGS. 4 and 4A). The cupping can range from 10:1 to a more pronounced cupping of 3:1.

The blade can be made of a stiff material such as metal, hard plastic or wood. The blade maintains its shape during operation. The blade can come in a variety of colors to match the lure or contrast with the lure. The size of the blade can be adjusted larger or smaller according to the lure. For example, a larger lure body typically requires a larger blade. The blade is sized so as not to interfere with the operation of the hooks when hooking a fish.

The blade 15 is connected to the body eye 31 by a twist arrangement. The twist arrangement comprises two or more rings 51, such as split rings. In the preferred embodiment, there are two circular rings 51. The individual rings need not be circular and can be oblong, tear-dropped shape, etc. Also, the size of the rings 51 can vary. Each ring is interlocked with the adjacent ring or rings or eye 31, like a chain. One end of the ring component passes through the blade hole 43 while the other end passes through the body eye 31. The rings 51 allow the blade to spin or rotate over a limited range. A freely rotating swivel is not used because such a swivel allows unlimited rotation. For example, with the eye 31 and two rings 51, the blade may rotate 420-470 degrees in one direction before stopping, and the same amount of rotation in the opposite direction.

When the blade 15 is in a neutral orientation, as shown in FIGS. 3 and 4, which is partway between the two limits of rotation, the ridge 35 is located above the tips 41 and the "V" (or in the case of the blade 15C shown FIG. 4A, the cup) faces down. In this neutral orientation, the blade rides up above the back of the lure body 17 and avoids fowling any hook on the tail of the lure body (see FIG. 1).

Figure 5:
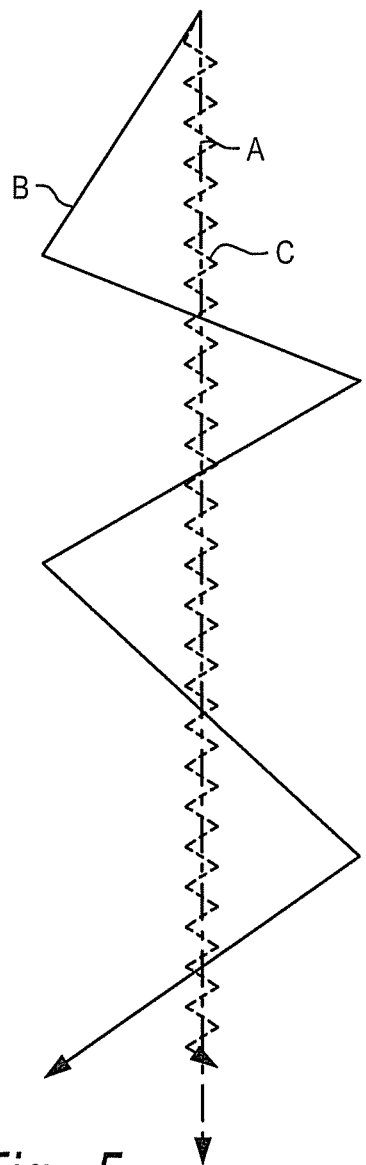
FIG. 5 is a schematic exemplary view showing the path of the lure of FIG. 1 on a retrieve, in addition to the path of a prior art lure.

In operation, a fisherman casts the lure and then retrieves it. Upon retrieve, the lure of course has forward motion toward the fisherman. A lure with no action is drawn straight to the fisherman along a line of retrieve as shown in FIG. 5 (the path is from top to bottom in FIG. 5). However, with the lure 11, the blade arrangement provides action to the lure causing the lure to move laterally off of the line of retrieve A. The water passing over the blade causes the blade 15 to rotate in one direction (see FIG. 4). The blade builds rotational momentum and when the blade reaches the limit of rotation, it abruptly stops 15-CCW1 (shown by dashed lines in FIG. 4) turning or locks. The lure body 17 then reacts to the rudder-like appendage of the fixed blade by moving laterally off of the path of retrieve A (see FIG. 5), shown by line B. The now-fixed blade traveling through water exerts a torque on the body 17. The blade is only locked temporarily because once the blade stops, the front end of the lure changes direction and the pressure on one side of the blade increases, causing the blade to rotate in the opposite direction. As it rotates in the opposite direction, the blade builds momentum until it reaches the limit of rotation and abruptly stops 15-CW (shown by the dashed-dotted lines in FIG. 4) once again, wherein the lure body reacts and moves laterally. The abrupt stopping of the rotation of the blade quickens the action or movement of the lure body.

The erratic movement of the lure body is further enhanced by the blade stopping at different positions or orientations. Referring to FIG. 4, if the blade rotates counter-clockwise (CCW) then it might stop at position 15-CCW1. However, on a subsequent counter-clockwise rotation, it might stop at another position 15-CCW2. This variation in stopped positions is due to the blade being coupled to the lure body by the ring component of interlocking rings or ring, with the eye 31. Having the blade stop at different positions or orientations increases the erratic movement of the lure body.

The rotation of the blade between the rotation limits also provides an accordion effect where the blade moves closer to and further from the body. In the neutral orientation, shown in FIG. 4 in solid lines, the blade 15 is at its farthest location from the body. As the blade rotates in either direction it is drawn closer to the body due to the twisting of the rings. The in-and-out-motion also affects the motion of the lure. The accordion effect contributes to the blade stopping at different positions or orientations and making the lure body move more erratically.

The side-to-side motion of the lure results in the lure acting erratically (shown by path B in FIG. 5) much like a natural bait fish that is scared or trying to flee. Such erratic action draws an aggressive reaction by predator fish on the lure. Often during the retrieve of a conventional lure, a fish will swim or draft closely behind the lure to inspect it before striking. Some fish will not strike and turn away due to the constant basic action of the lure. Utilizing the present invention, the lure will have an erratic action in both timing and direction changes.

The amount of erratic side-to-side motion can be adjusted by substituting blades of differing sizes. For example, to increase the side-to-side motion, a larger blade is used. Conversely, to decrease the side-to-side motion, a smaller blade is used.

By increasing the retrieve speed of a conventional lure will only cause its path to be straighter and more predictable. With the present invention, increasing the retrieve speed increases the erratic action and amount of direction changes that occur. So by adjusting the speed of the lure retrieval, will cause a variety of different series of actions accordingly.

FIG. 5 also shows the retrieve path C of a conventional fishing lure with a tail that does not rotate, such as is shown in U.S. Pat. No. D199,624. I have compared fishing lures with both types of tails or blades and observed that the conventional lure, while it does have some side-to-side action, produces a regular, zig-zag, pattern of movement, with or without the added tail section, with smaller lateral deviations from the retrieval path A. In contrast, my fishing lure has more erratic movement, with significantly larger lateral deviations from the retrieval path A. The blade arrangement may cause the lure 11 to not only move in a horizontal manner but also vertically (up and down) as well.

In general, a lure is designed to have a particular type of action or movement on retrieve. The blade arrangement typically does not alter the designed movement of a lure, but adds erratic behavior. Regarding the lure 11 of FIG. 1, the lure moves in a jittery zig-zag motion, but with frequent, erratic side-to-side departures. Although line B in FIG. 5 has been shown as a series of solid, straight line segments, the line segments exhibit some zig-zag motion.

As mentioned, the lure can be of a variety of types and styles. FIGS. 6-9 illustrate some additional examples. FIG. 6 shows another fishing lure 61, a lipless crank bait. A lipless crank bait is designed to move in a side-to-side wobbling action. The present invention makes the action more erratic. The fishing line eye 23 is moved to the top area of the lure, but still on the front end portion 19 so that on retrieve, the front of the lure leads. Without the blade arrangement, the lure body has a straight line retrieve, with a tight shimmy.

The blade arrangement 15, 51 is attached to an eye 31 on the top area at the rear end portion 21. The eye 31 can be moved to the rear end of the body. This eye 31 is dedicated to the blade and does not receive a hook. With the blade arrangement, the lure 61 moves erratically and does not move on a straight line. The erratic motion can be up, down, right side, left side. The lure still has shimmy movement as well.

Figure 7:
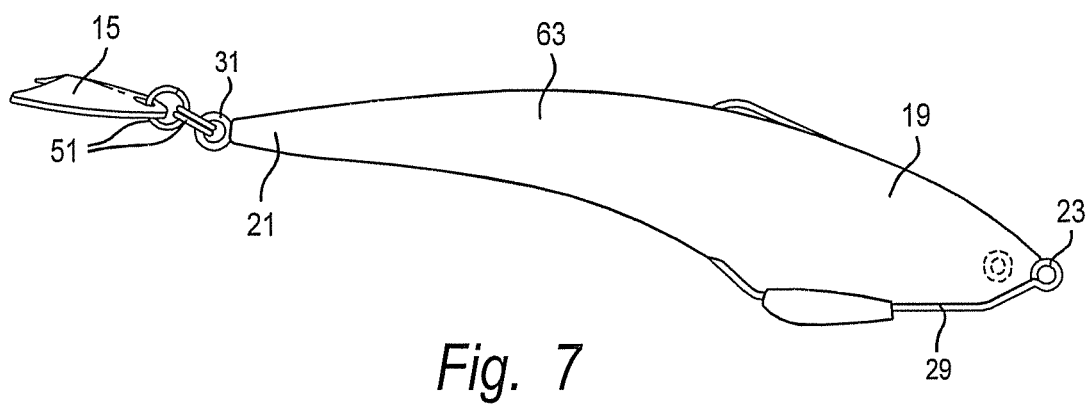
FIG. 7 is a side view of a fishing lure in accordance with still another embodiment.

FIG. 7 shows a soft plastic swim bait 63 equipped with hook 29. Swim baits are designed with some movement, for example some side-to-side wiggle. Without the blade arrangement, the swim bait moves as it is designed.

The blade arrangement is attached to an eye 31 at the rear end of the body. With the blade arrangement, the movement of the swim bait 63 becomes larger in magnitude and more erratic, moving side-to-side or up, down.

Figure 8:
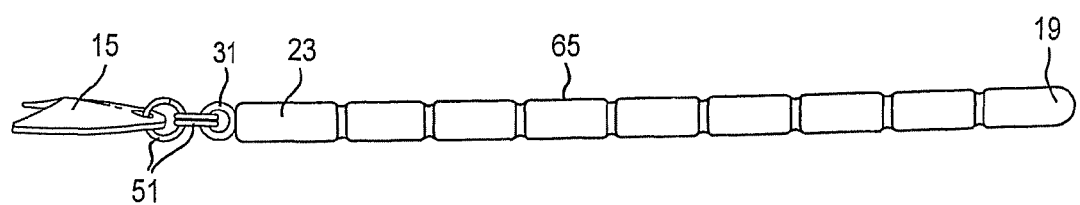
FIG. 8 is a side view of a fishing lure in accordance with still another embodiment.

FIG. 8 shows a soft plastic worm 65. The worm can be rigged with a hook in a conventional manner. The conventional worm moves on a straight line retrieve.

The worm is modified by attaching the blade arrangement to an eye 31 at the rear end of the worm body 65. The eyes 31 of the lures 63, 65 can be secured to the body in a conventional manner, such as by using a helical wire arrangement. The blade arrangement causes the worm to move erratically. As the blade rotates, the worm moves in a straight line. However, when the blade stops rotating, the worm rotates in one direction and jumps in one direction. When the blade changes rotation and then stops, the worm rotates and jumps in another direction.

Figure 9:
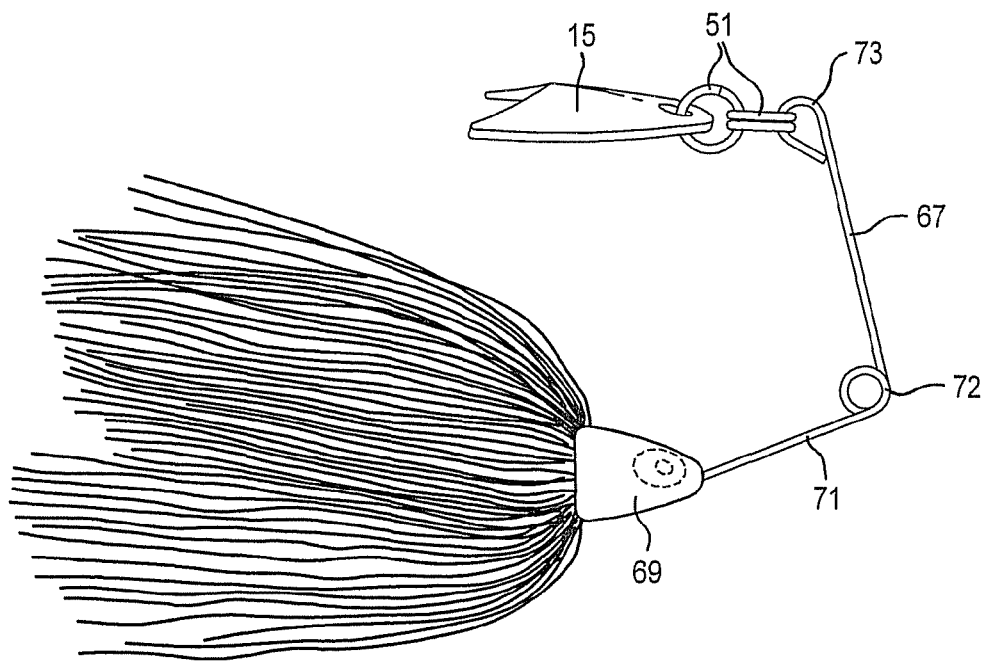
FIG. 9 is a side of a fishing lure in accordance with still another embodiment.

FIG. 9 shows a spinner bait 67 having a jig portion 69. The jig portion is attached to one end of a wire harness 71. The harness 71 is shaped like a "V" having an eye 72 at the apex of the "V" for receiving a fishing line. The other end of the harness 71 has an eye 73. A conventional spinner bait attaches a blade to the eye 73 with a swivel. During retrieve of a conventional spinner bait, the blade rotates continuously without stopping, while the lure moves on a straight line. Typically, the lure is below the rotating blade.

When the spinner bait 67 is modified to attach the blade arrangement, the action of the lure changes dramatically. The blade 15 is attached to the eye 73 by way of the rings 51. The spinner bait 67 has a front end portion by the eye 72. The wire harness 71 is the body, which has two rear end portions. The eye 73 is at one rear end portion. The other rear end portion is formed by the jig portion 69. During retrieve, the blade rotates in one direction and stops and then reverses the direction of rotation. While the blade is rotating, the jig portion behaves normally. However, when the blade stops rotating, the blade jerks in a direction, whether that is up, down or sideways. The jig portion erratically jerks as well. When the blade reverses rotation and stops in another position, the blade and jig portion erratically jerk in another direction.

Thus, the blade can be used on a variety of lure or baits, only some of which have been illustrated and discussed. While preserving the movement of the lure while the blade is rotating, when the blade stops rotating, the blade arrangement dramatically changes the action or movement of the lure, introducing erratic motion and in many lures, introducing a large side-to-side (or up and down) component of movement.

A swivel need not be used at the forward end of the lure. This is because the lure rotates in one direction, twisting the line and then rotates in the opposite direction, untwisting the line. Thus, using a lure equipped with the blade 15 does not cause line twist.

The foregoing disclosure and showings made in the drawings are merely illustrative of the principles of this invention and are not to be interpreted in a limiting sense.

The invention claimed is:

1. A fishing lure, comprising:
   a) a body having a tail end portion and a front end portion;
   b) an eye coupled to the tail end portion of the body;
   c) a blade having a front end and a top portion extending rearward from the front end, the blade having first and second lateral portions extending from the top portion laterally and rearwardly, the lateral portions being non-planar with respect to one another;
   d) the front end of the blade being coupled to the eye by at least two rings interlocked with the eye to form a chain, wherein the blade can rotate between first and second limits with respect to the body.

2. The fishing lure of claim 1, wherein each of the first and second lateral portions has a leading edge extending from the ridge laterally and rearwardly and a trailing edge extending from the ridge laterally and rearwardly.

3. The fishing lure of claim 2, wherein each of the first and second lateral portions is generally triangular when viewed in plan view.

4. The fishing lure of claim 1, wherein the blade looks like a "V" when viewed from the blade front end.

5. The fishing lure of claim 1, wherein the blade looks like a "U" when viewed from the blade front end.

6. The fishing lure of claim 1, wherein the body has a top, the blade has a neutral orientation between the first and second limits, wherein when the blade is in the neutral orientation, the top portion is above the lateral portions.

7. The fishing lure of claim 1, wherein the rings are split rings.

8. The fishing lure of claim 1, wherein:
   a) each of the first and second lateral portions has a leading edge extending from the ridge laterally and rearwardly and a trailing edge extending from the ridge laterally and rearwardly;

b) each of the first and second lateral portions is generally triangular when viewed in plan view;
c) the blade looks like a "V" when viewed from the blade front end;
d) the body has a top, the blade has a neutral orientation between the first and second limits, wherein when the blade is in the neutral orientation, the top portion is above the lateral portions.

9. The fishing lure of claim 1, wherein the body is a crank bait.

10. The fishing lure of claim 1, wherein the body is a swim bait.

11. The fishing lure of claim 1, wherein the body is a worm.

12. The fishing lure of claim 1, wherein the lure is a spinner bait.

\* \* \* \* \*